F. L. WILTSHIRE.
ELECTRICAL TRANSFORMER CONTROLLER AND DISTRIBUTER.
APPLICATION FILED DEC. 12, 1914.
1,158,091.
Patented Oct. 26, 1915.
3 SHEETS—SHEET 2.
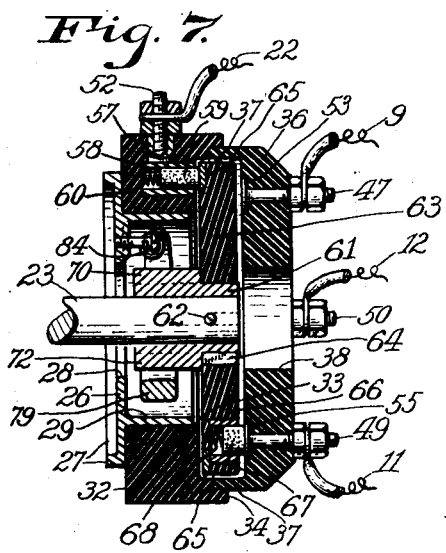
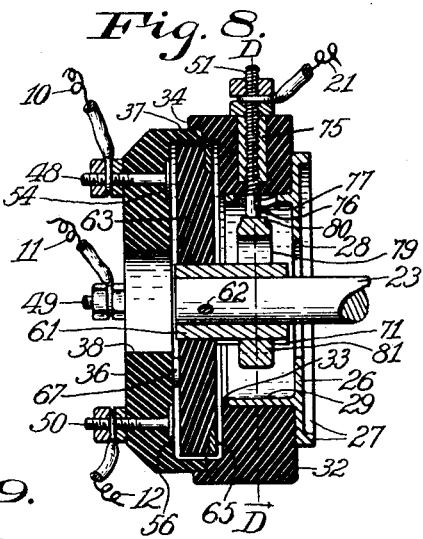
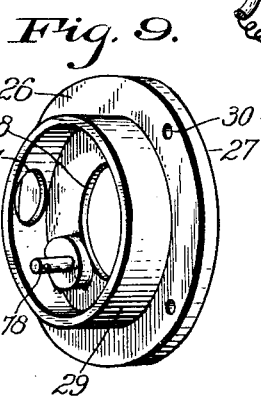
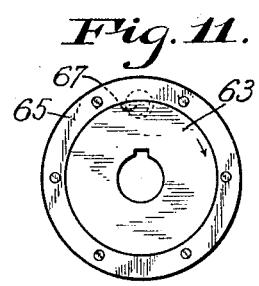
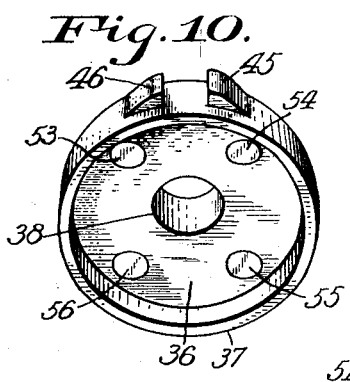
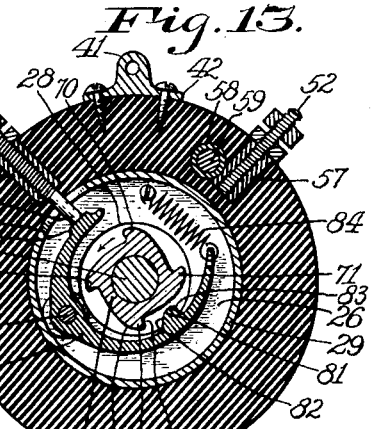
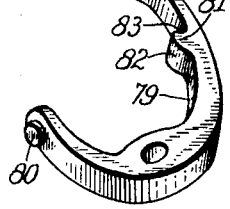
WITNESSES:
J. H. Gardner
M. E. Sparrow
INVENTOR:
Fred L. Wiltshire,
BY
E. T. Silvius.
ATTORNEY.

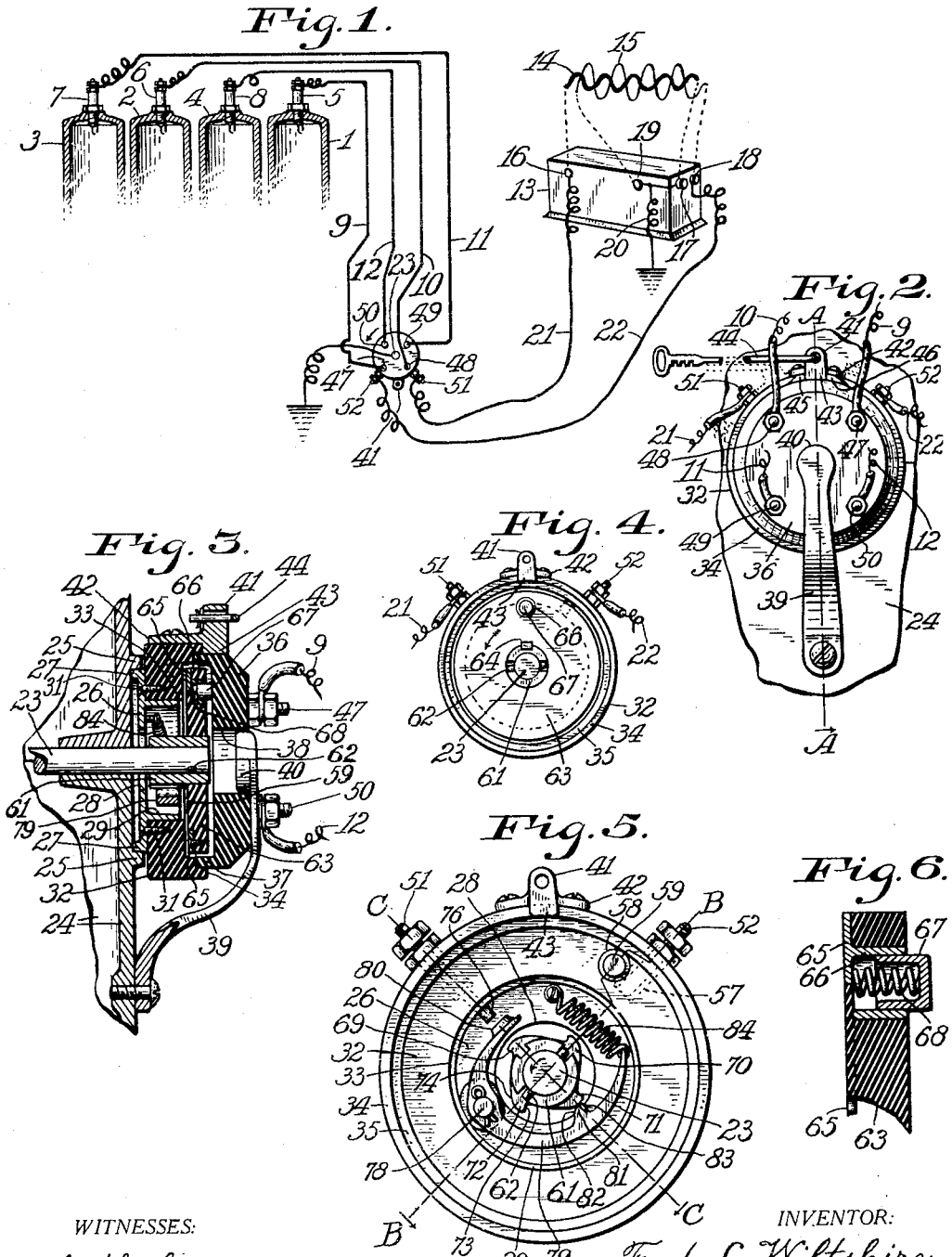

F. L. WILTSHIRE.
ELECTRICAL TRANSFORMER CONTROLLER AND DISTRIBUTER.
APPLICATION FILED DEC. 12, 1914.
1,158,091.  Patented Oct. 26, 1915.
3 SHEETS—SHEET 3.
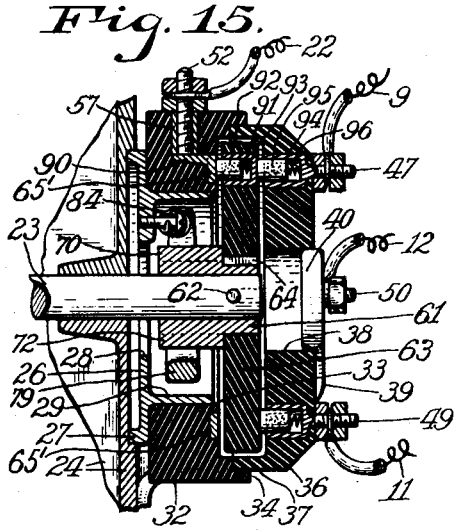
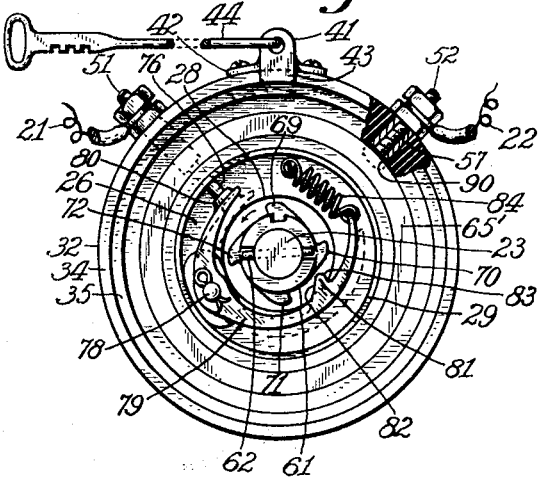
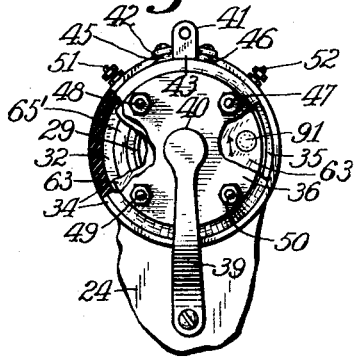
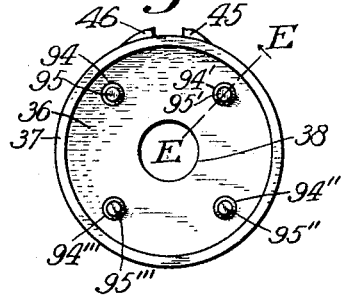
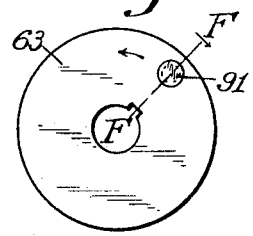
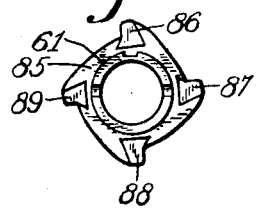
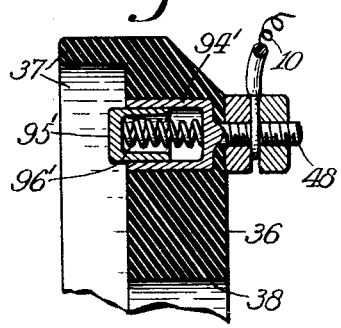
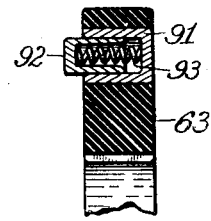
WITNESSES:
J. H. Gardner
M. E. Sparrow
INVENTOR:
Fred L. Wiltshire,
BY
E. T. Silvius,
ATTORNEY.

UNITED STATES PATENT OFFICE.

FRED L. WILTSHIRE, OF MARTINSVILLE, INDIANA, ASSIGNOR, BY DIRECT AND MESNE ASSIGNMENTS, TO MARTINSVILLE IGNITION COMPANY, OF MARTINSVILLE, INDIANA, A CORPORATION OF INDIANA.

ELECTRICAL TRANSFORMER-CONTROLLER AND DISTRIBUTER.

1,158,091. Specification of Letters Patent. Patented Oct. 26, 1915.

Application filed December 12, 1914. Serial No. 876,779.

*To all whom it may concern:*

Be it known that I, FRED L. WILTSHIRE, a citizen of the United States, residing at Martinsville, in the county of Morgan and State of Indiana, have invented a new and useful Electrical Transformer - Controller and Distributer, of which the following is a specification, reference being had to the accompanying drawings and to the letters and figures of reference marked thereon.

This invention relates to an ignition system for internal-combustion engines, and has reference more particularly to such systems as those which use an electrical current from a synchronously driven high frequency alternating current magneto.

An object of the invention is to provide a combination apparatus that shall be so constructed as to be compact in arrangement, substantially as a unitary structure, and capable of acting as a transformer circuit breaker and distributer and especially adapted to be used in connection with a magneto of the above-mentioned character, preferably with a condenser as a precautionary measure.

Another object is to provide a relatively small apparatus that shall be adapted to operate in a relatively small space, and especially adapted to perform both the function of a transformer circuit breaker and also a distributer for the induction current from the transformer to different spark plugs or ignition devices.

Another and more specific object is to provide an ignition system that shall be so constructed as to avoid the necessity of using a vibrating jump spark coil and therefore eliminate the trouble and expense inseparable from the use of such coils, the improved ignition system comprehending the use of a transformer or non-vibrating induction coil, to the end that the cost of installation and operation of an ignition system shall be reduced to the minimum.

With the above-mentioned and other objects in view the invention consists in providing a primary electrical circuit, suitable circuit connectors, and rotary means for breaking the primary circuit to induce a secondary current and also distribute the secondary current, the invention consisting further and more specifically in the novel construction and in the parts, and combinations and arrangements of parts, as hereinafter particularly described and further defined in the accompanying claims.

Referring to the drawings,—Figure 1 is a diagrammatic view illustrating the arrangement and connections of the invention with the spark plugs of a four-cylinder explosion engine and a coil box of well-known type; Fig. 2 is a front elevation of the essential structure involved in the invention; Fig. 3 is a section approximately on the line A A on Fig. 2; Fig. 4 is a front elevation of a portion of the structure omitting front parts thereof; Fig. 5 is a front elevation of the structure with front parts thereof omitted; Fig. 6 is a fragmentary section of one of the devices for distributing the ignition current; Fig. 7 is a section of the complete structure approximately on the line B B on Fig. 5; Fig. 8 is a section of the complete structure approximately on the line C C on Fig. 5; Fig. 9 is a perspective view of a metallic supporting casing comprising a part of the structure; Fig. 10 is a perspective view showing the front or cap portion of an improved insulating frame; Fig. 11 is a rear elevation of the device forming a part of the distributing apparatus; Fig. 12 is a perspective view of a metallic rotary part constructed to carry the distributing device and also to cause the breaking of the primary circuit; Fig. 13 is a section on the line D D on Fig. 8; Fig. 14 is a perspective view of the movable part of the primary circuit breaker; Fig. 15 is a section of the complete structure slightly modified with respect to the distributing means, the section corresponding to the plane of the line B B; Fig. 16 is a front elevation of the modified structure omitting front parts thereof; Fig. 17 is a front elevation of the modified structure partially broken away; Fig. 18 is a rear elevation of the front or cap part of the modified hollow insulating frame; Fig. 19 is a front view of the modified distributing device; Fig. 20 is a front elevation of the device slightly modified whereby to cause the breaking of the primary circuit; Fig. 21 is a fragmentary section on the line E E on Fig. 18; and, Fig. 22 is a fragmentary section on the line F F on Fig. 19.

Similar reference characters on the various figures of the drawings indicate corresponding elements or features of construction herein referred to.

For the purpose of clearly explaining the purpose and function of the invention, portions of an explosion engine with which the invention is connected are illustrated, the engine conveniently having four cylinders 1, 2, 3, 4, designated in the order in which explosions are to occur. The cylinders are provided respectively with spark plugs 5, 6, 7, 8, to which are connected ignition circuit wires 9, 10, 11, 12. A well-known form of coil box 13 is conveniently used as part of the system, it being understood that the box contains a transformer comprising a primary coil or winding 14 and a secondary coil or winding 15 which are shown as having been withdrawn from the box in the interest of clearness of description. The box is provided with binding posts 16, 17, 18, 19, and a ground wire 20. The primary coil has connections shown by broken lines with the post 16 and also the post 17 with which the ground wire is connected. The secondary coil has connections shown also by broken lines with the post 18 and also with the post 19 to which the ground wire is connected. A primary or low-tension circuit wire 21 is connected to the post 16 and thereby with the primary coil, a secondary or high-tension circuit wire 22 being connected to the post 18 and thereby with the secondary coil.

A suitable rotary shaft 23 is made use of and may conveniently be the end portion of a valve-timing shaft to be run at one-half of the speed of the crank shaft of the engine, being rotatably supported by a suitable frame 24.

The elements above mentioned being well known require no further description as to structure, and it will be understood also that for obvious reasons it will be advantageous to combine a condenser with the non-vibrating induction coil.

For the purpose of the present invention the frame 24 is provided with a ring or annular shoulder 25 that is arranged concentrically to the shaft 23. A casing is provided which comprises a base plate 26 having a flange or bearing rim 27 that is fitted into the ring or shoulder 25 for rotatively guiding the casing, the base plate having a central aperture 28 through which the shaft extends. The casing includes also a cylinder 29 that is fixed on the base plate concentrically to the shaft. The base plate has a suitable number of holes 30 near the periphery thereof that receive screws 31 whereby a main member 32 forming a part of a hollow insulating housing frame is secured to the casing, the member having a bore 33 therein receiving the cylinder 29. The front of the member has a forwardly extending rim portion 34 in which is a recessed annular seat 35. The insulating frame comprises also a cap or front part 36 having on its rear side a projecting annular rim portion 37 that is closely fitted into the rim portion 34 and is normally in contact with the seat 35. The two parts of the insulating frame are composed of suitable electrical insulating material such as vulcanized fiber. The front or cap portion 36 has a suitable center bearing 38. A spring arm 39 is secured to the frame 24 and extends against the front of the part 36, the arm having a centering bearing boss 40 thereon that extends into the center bearing for assisting in centrally supporting the frame, the arm normally holding the cap or front part to the main part and also holding the base plate 26 to the frame 24 while permitting the insulating frame to be adjusted rotatably for advancing the ignition periods. The adjustment and control of the frame is accomplished by means of an arm 41 having a base plate 42 thereon which is fixedly secured to the edge or periphery of the main member 32, the arm having a lug 43 thereon that extends over the exposed front portion of the rim 34 and to the periphery of the front part 36. A controlling rod 44 is connected to the arm whereby to adjust the frame or hold it in fixed position. The front part 36 has two ears 45 and 46 that engage opposite sides respectively of the lug 43 for keying the front part in prearranged position on the main member of the frame. The front part 36 is provided with binding posts 47, 48, 49, 50, to which the ignition circuit wires 9, 10, 11, 12 are respectively connected, the posts being provided with suitable devices to constitute circuit connectors. The main member 32 is provided with a binding post 51 to which the primary or low-tension circuit wire 21 is connected, the member being provided also with a binding post 52 to which the secondary or high-tension circuit wire 22 is connected. In one form of construction the binding posts extend through the front part 36 and have heads thereon that are set in flush with the inner face of the front part so as to form connectors 53, 54, 55, 56, respectively, with which contact is to be made to complete the electrical circuits. Preferably the post 52 is connected to a thimble 57 inserted in the periphery of the member 32 and having contact with a metallic guide bushing 58 that is inserted into the front of the member adjacent to the rim portion 34, the bushing movably guiding a cup-shaped connector or contact device 59 provided with a spring 60 which projects the connector beyond the front face of the member 32.

A metallic hub 61 is fitted onto the shaft 23 and caused to rotate therewith by means of a pin 62 inserted in the shaft, or otherwise if desired, and a disk-like wheel 63 composed of vulcanized fiber or other insulating material is secured on the hub by a key 64, or otherwise, the hub being partially within the cylinder 29 and rotatably supporting the wheel in the space between the main member 32 and the front or cap part 36. An annular metallic distributing plate 65 is secured to the back of the wheel 63 and has a guide cylinder 66 thereon that is embedded in the wheel and guides a cup-shaped connector or contact device 67 in which is a spring 68 that normally projects the connector beyond the front face of the wheel, the arrangement being such as to bring the connector successively into contact with the connectors on the inner side of the front part 36 on rotation of the wheel, the connector 67 connecting the circuit through the distributing ring 65 that is constantly in contact with the connector 59. The hub 61 has a suitable number of cams 69, 70, 71, 72 thereon, each cam having an abrupt front face 73 and a gently receding back face 74. The binding post 51 is adjustably screwed into a bushing 75 that is fixedly secured in the peripheral portion of the main member 32 of the insulating frame, the post extending through an aperture in the member 32, the inner end of the post being adapted to constitute an electrical contact point 76, there being a sufficiently large aperture 77 formed in the wall of the cylinder to freely receive the inner portion of the binding post. The base plate 26 is provided with a pivot post 78 that is within the cylinder 29, and a lever 79 is connected between its ends to the pivot post, the lever being approximately crescent-shaped and constituting a circuit-breaker element, the outer side of one end portion of the lever having a contact point or portion 80 thereon that is normally in contact with the contact point or portion 76 of the binding post 51 to complete the primary or low-tension circuit with the casing grounded on the supporting frame 24. The inner side of the opposite portion of the lever has a cam-shaped projection 81 thereon, the projection having a gently slanting front face 82 and an abrupt rear face 83, so that when a cam, as 71 and 72, strikes the front face 82 the lever is forced to break the connection with the contact point 76, and as the receding face 74 of the cam permits the projection to slide gradually from the cam the contact point or portion 80 is prevented from being injuriously pounded on the contact point 76, the latter therefore being prevented from being injuriously affected. The end of the lever beyond the projection has a retracting spring 84 connected thereto, the spring being suitably connected to the base plate 26 for holding the lever in normal position.

In some cases the hub 61 and the cams thereon may be formed integrally. In other cases a collar 85 may be formed on or secured to the hub and provided with inserted cam portions 86, 87, 88, 89, composed of material different from that of the collar portion or the hub and adapted to withstand a relatively greater amount of wear, the modification being shown only in Fig. 20 but omitted, in the interest of clearness of illustration, in the preceding figures of the drawings.

The structure in some cases may be slightly modified without affecting the results of operation, as for example the bushing 57 may be in contact with an electrical conductor 90 inserted in the main member 32 in place of the conducting devices 58 and 59; and instead of providing the wheel 63 with the distributing ring 65, a distributing ring 65' is fixed on the front of the member 32 in contact with the conducting device 90, the latter preferably being formed integrally with the ring, the ring being concentric to the shaft 23. The wheel 63 instead of being provided with conducting devices, shown more clearly in Fig. 6, is provided with similar devices in reversed order, as shown more clearly in Fig. 22 and comprising a cup-shaped electrically conducting guide 91 embedded in and extending transversely through the wheel 63 with its open front toward the distributing ring, and a hollow or cup-shaped circuit connector 92 arranged with its open end inward and its closed end against the distributing ring 65', being yieldingly held in projected position by a spring 93 therein seated in the guide 91, the closed end of which is flush with the outer or front side of the wheel for successively contacting with suitable yielding connectors with which the binding posts 47, 48, 49 and 50 are provided. Each connector comprises a cup-shaped conducting guide 94, 94', 94" or 94''' fixed on or connected to a binding post, a hollow or cup-shaped guide 95, 95', 95" or 95''' movably guided in the guide and held in projected position against the front of the wheel 63 by a spring 96 or 96' suitably arranged therein, the result being that on rotation of the wheel the secondary or high-tension current is distributed from the wire 22 through the wheel and successively to the ignition circuit wires 9, 10, 11 and 12.

It will be obvious from the foregoing that the invention is not limited to the particular constructions shown, but that various other modifications may fairly be made within the scope of the accompanying claims. The structure, as will be obvious, may be variously arranged with respect to the explosion engine and the electrical generator or storage battery as mechanical expediency may indicate as desirable.

In practical use upon starting the explosion engine the shaft 23, which being suitably rotated in synchronism with the engine, periodically breaks the primary or low-tension circuit at the points 76 and 80, the conducting means carried by the wheel 63 making contact with the proper one of the connectors of the ignition circuit wires simultaneously with the breaking of the low-tension circuit, the breaking of the circuit automatically causing induction to take place in the transformer from the primary to the secondary winding, so that a sparking circuit is afforded and properly distributed by the controlling appliances that control the transformer and also the distribution of the sparking current. The controlling rod 44 may be moved when desired for advancing or retarding the periods of ignition of the explosive charges in the engine, as will be readily understood, the flexibility of the circuit wires connected with the hollow insulating frame permitting the desired amount of movement of the frame without hindrance. The movement of the various parts and results of operation will be readily understood from a consideration of the description of construction and function thereof without further explanation.

Having thus described the invention, what is claimed as new is—

1. An electrical transformer controller including an electrical conducting casing, a non-conducting hollow frame fixedly secured to the casing, a primary circuit contact point supported in the frame, a conducting circuit-breaking lever pivotally supported on the interior of the casing and having a contact point thereon, a spring connected to the lever and the casing and normally holding the lever to complete the primary circuit at the contact points, and a hub rotatable in the casing and having a cam thereon to repeatedly engage and move the lever in opposition to the spring for periodically breaking the primray circuit at the contact points.

2. An electrical transformer controller including an electrical conducting casing, a hollow non-conducting frame comprising a main member fixedly secured to the casing and a cap part removably connected to the main member, a primary circuit conducting device secured in the main member of the hollow frame and having a contact point thereon and supported thereby in the casing, a conducting circuit-breaking lever pivotally supported on the interior of the casing and having a contact point thereon, a spring connected to the lever and the casing and normally holding the lever to complete the primary circuit at the contact points, and a hub rotatable in the casing and having a cam thereon to repeatedly engage and move the lever in opposition to the spring for periodically breaking the primary circuit at the contact points.

3. An electrical transformer controller and distributer including an electrical conducting casing, a hollow housing frame comprising a non-conducting main member fixedly secured to the casing and a cap part keyed to the main member, a device engaging the cap part and removably securing the cap part to the main member, a primary circuit conducting device secured to and extending through the wall of the main member and extending into the casing free from contact with the casing, the conducting device having a contact point on its inner end and a binding screw on its outer portion, movable means in the casing coöperating with the contact point for making a primary electrical circuit, means in the casing to act on the movable means for periodically breaking the primary circuit, and means in the hollow frame for distributing a secondary current.

4. An electrical transformer controller and distributer including an electrical conducting casing, a hollow frame fixedly secured to the casing, a primary circuit contact point supported in the hollow frame, a hub rotatable in the casing and having a plurality of cams and also a non-conducting wheel fixed thereon, a curved conducting circuit-breaking lever pivotally supported between its ends on the interior of the casing and having a contact point thereon opposite to the primary circuit contact point, the lever extending partially about the hub, and having a projection to be engaged by the cams to break the circuit at the contact points, a spring connected to the lever and the casing for yieldingly holding the lever to complete the primary circuit at the contact points, an electrical connector extending transversely through the wheel and carried thereby, and means on opposite sides of the wheel coöperating with the electrical connector for successively connecting a secondary conducting wire with ignition wires supported by the hollow frame synchronously with the breaking of the primary circuit.

5. An electrical transformer controller and distributer including a non-conducting hollow frame, a binding post inserted in the frame and having an electrical conductor connected thereto, a distributing ring in the hollow frame and in constant contact with the conductor, a plurality of binding posts on the front of the frame and having each an electrical connector that is positioned on the interior of the frame, and a rotary non-conducting wheel between the distributing ring and the electrical connectors; and having an electrical conductor extending transversely therethrough from the distributing ring to be carried successively to the electrical connectors of the binding posts.

6. A low-tension circuit breaker and high-tension current distributer combined in a unitary structure and comprising a supported hollow conducting casing, a non-conducting hollow frame fixedly secured to the casing, a low-tension circuit wire having connection with the hollow frame for support and provided with a contact point that is arranged within the casing, a circuit breaker comprising a curved lever pivotally supported in the casing by a portion thereof and having a contact point that is normally in contact with the contact point of the low-tension circuit wire, the lever having a projection thereon, a spring connected to the casing and the lever and yieldingly holding the lever in normal position, a hub rotatable in the casing and having a plurality of cams thereon for engagement with the projection of the lever to break the low-tension circuit, a high-tension circuit wire connected with the wall of the hollow frame for support and provided with a connector that extends to the interior of the frame, a plurality of ignition circuit wires connected to the front of the frame and having connectors that extend to the interior of the frame, and movable means within the frame between the high-tension circuit wire and the ignition circuit wires and controlled by the hub for making electrical connection with the connector of the high-tension wire and also successively with the connectors of the ignition circuit wires.

7. In an electrical transformer controller and distributer, the combination of an electrical conducting casing, a non-conducting hollow frame fixedly secured to the casing, a primary circuit contact point supported in the hollow frame, a conducting circuit-breaking lever that is crescent-shaped and pivotally supported between its ends on the interior of the casing and having a contact point on the outer side of one end portion thereof, a spring connected to the opposite end portion of the lever and also to the casing for yieldingly holding the lever to complete the primary circuit at the contact points, a hub rotatable in the casing and having a plurality of cams thereon for engagement with a portion of the lever to break the primary circuit at the contact points and also time the distribution of a secondary electrical current induced by the breaking of the primary circuit, and means in the hollow frame and operated in synchronism with the action of the cams for successively connecting a secondary conducting wire with ignition circuit wires supported by the hollow frame.

8. In an electrical transformer controller and distributer, the combination with a supporting frame, of a metallic casing supported on the frame, a two-part non-conducting hollow frame fixedly secured to the casing and having a center-bearing in the front thereof, a spring-arm secured to the supporting frame and having a center-bearing thereon engaging the center-bearing of the hollow frame for holding the front part to the remaining part of the hollow frame and also holding the casing to the supporting frame, means in the casing for breaking a primary circuit, and means in the hollow frame for distributing a secondary current to a plurality of ignition circuit wires.

9. In an electrical transformer controller and distributer, the combination with a supporting frame, of a metallic casing and rotatively guided adjustably on the frame, a hollow non-conducting frame comprising a main member fixedly secured to the casing and a cap part keyed to the main member, an arm supported by the supporting frame and having contact with the front of the cap part for holding the cap part to the main member and also holding the casing to the supporting frame, a controlling arm secured to the main member of the non-conducting frame, a rod connected to the controlling arm, a primary-circuit breaker in the casing, and means in the non-conducting frame for distributing a secondary current.

10. In an electrical transformer controller and distributer, the combination with a circuit contact point, of a pivoted and grounded circuit breaker normally in contact with the contact point and having a projection thereon, the front face of the projection being slanting and the rear face abrupt, a spring connected to and yieldingly holding the breaker in normal position, and a rotatable device having cams thereon for engagement successively with the projection, the front face of each cam being abrupt for engagement with the slanting face of the projection to break the circuit, each cam having a receding rear face for gradually guiding the breaker back to the contact point to close the circuit.

11. In an electrical transformer controller and distributer, the combination of a non-conducting hollow frame, a binding post secured to the frame, a spring-pressed connector in the frame and connected with the post, a non-conducting wheel rotatable in the frame, a distributing ring secured to the back of the wheel and in connection with the connector, the wheel having an electrical contact device and connected to the ring, the contact device being spring-pressed beyond the front of the wheel, and a plurality of ignition circuit wires having binding posts secured to the front of the hollow frame, the posts having connectors presented on the interior of the hollow frame to be successively engaged by the contact device of the wheel.

In testimony whereof, I affix my signature in presence of two witnesses.

FRED L. WILTSHIRE.

Witnesses:
E. F. BRANCH,
ERNEST SHIELDS.

Copies of this patent may be obtained for five cents each, by addressing the "Commissioner of Patents, Washington, D. C."